United States Patent [19]

Kono et al.

[11] Patent Number: 5,319,288

[45] Date of Patent: Jun. 7, 1994

[54] MAIN SPINDLE ROTATION CONTROL METHOD

[75] Inventors: Shinichi Kono; Masaaki Fukukura, both of Oshino, Japan

[73] Assignee: Fanuc Ltd, Minamitsuru, Japan

[21] Appl. No.: 13,172

[22] Filed: Jan. 29, 1993

Related U.S. Application Data

[63] Continuation of Ser. No. 687,868, Jun. 4, 1991, abandoned.

[30] Foreign Application Priority Data

Oct. 6, 1989 [JP] Japan .................. 1-260157

[51] Int. Cl.⁵ .............................................. H02P 7/00
[52] U.S. Cl. ............................................. 318/66; 318/85
[58] Field of Search ..................................... 318/66-68, 318/74, 77, 79, 85, 434, 561, 565, 606, 616, 618, 625, 632, 638, 635, 609; 388/810, 811, 813, 903, 906

[56] References Cited

U.S. PATENT DOCUMENTS

| | | | |
|---|---|---|---|
| 3,668,498 | 6/1972 | Austin, Jr. .................. | 318/85 X |
| 3,750,927 | 8/1973 | Miller et al. ................. | 318/85 |
| 4,297,624 | 10/1981 | Komiya ..................... | 318/625 X |
| 4,310,787 | 1/1982 | Seeger et al. ............... | 318/85 |
| 4,617,498 | 10/1986 | Ruppert ..................... | 318/85 |
| 4,656,897 | 4/1987 | von Niederhäusern et al. | 318/625 X |
| 4,703,431 | 10/1987 | Saho et al. .................. | 318/625 X |
| 4,841,212 | 6/1989 | Matsushita et al. ........... | 318/632 X |
| 4,862,380 | 8/1989 | Kawamura et al. ........... | 318/625 X |
| 4,914,370 | 4/1990 | Sakamoto et al. ............ | 318/616 |
| 5,037,252 | 8/1991 | Hasagawa et al. ............ | 318/625 X |
| 5,047,702 | 9/1991 | Hanaki et al. ............... | 318/625 |

FOREIGN PATENT DOCUMENTS

0203452A1 5/1985 European Pat. Off. .
2206516A 4/1988 United Kingdom .

OTHER PUBLICATIONS

Robert D. Lorenz et al., Synchronized Motion Control For Process Automatin, 1989, Conference Record of the 1989 IEEE Industry Applications Society Annual Meeting Part II, IEEE Catalog No. 89CH2792-0, pp. 1694-1698.

*Primary Examiner*—Jonathan Wysocki
*Attorney, Agent, or Firm*—Staas & Halsey

[57] ABSTRACT

A main spindle rotation control method capable of preventing a workpiece from being twisted during the delivery of the workpiece between two main spindles of a machine. When the rotating speeds of first and second main spindles (100, 200) reach a synchronous rotating velocity as a result of a speed loop control executed by velocity control sections (111, 211) of first and second spindle control circuits (110, 210), position loop control is executed by position control sections (112, 212) of these control circuits, and each main spindle is driven to be decelerated in accordance with the rotational phase of each main spindle, and the velocity loop control is then executed again, to bring the main spindles to rotate in the same phase and at the same synchronous rotating speed. When the delivery of the workpiece (300) between the main spindles is started under this condition, integral control in both the velocity control sections is invalidated. Thus, even if a difference is present between the rotating speeds of the two main spindles at the start of the workpiece delivery, due to fluctuations in the main spindle rotating speeds, a difference between torque commands from the velocity control sections, attributable to the difference between the main spindle rotating speeds, never be gradually increased by the integral control, to thereby prevent the workpiece from being twisted.

6 Claims, 3 Drawing Sheets

MAIN SPINDLE ROTATION CONTROL METHOD

This application is a continuation of application U.S. Ser. No. 07/687,868, filed Jun. 4, 1991, now abandoned.

TECHNICAL FIELD

The present invention relates to a main spindle rotation control method for a machine having two main spindles, and more particularly, to a main spindle rotation control method capable of preventing a workpiece from being twisted during the delivery of the workpiece between the two main spindles.

BACKGROUND ART

In a lathe or the like which has two main spindles, it is known to cause the main spindles to rotate at the same speed, where required. For example, the two main spindles are rotated at the same speed so that the workpiece can be smoothly delivered therebetween, when a shift is made from a state in which one end portion of a workpiece is held by a first chuck coupled to one main spindle of the lathe to a state in which the other end portion of the workpiece is held by a second chuck coupled to the other main spindle (i.e., at the time of workpiece delivery). In case that a workpiece having a shape which is anisotropic with respect to the workpiece axis is delivered from the first chuck to the second chuck, however, the workpiece sometimes may run against the second chuck to be damaged or deformed when the respective rotational phases (rotational angle positions) of the two chucks are different, even if these chucks are rotating at the same speed.

In order to eliminate such an awkward situation, the inventor hereof proposed a main spindle rotation control method in which two main spindles are rotated at the same speed and in the same phase (see, Japanese Patent Application No. 1-192751 and its equivalent International Patent Application No. PCT/JP90/00506). According to this proposed method, when the two main spindles are brought to rotate at the same synchronous rotating speed under speed control in accordance with a synchronous speed command, a positional deviation amount corresponding to the synchronous rotating speed is calculated on the basis of the synchronous speed command, and the calculated amount is set in each of positional deviation counters associated with the two main spindles. Thereafter, position control is performed for each of the main spindles in response to a move command corresponding to the synchronous rotating speed and a position feedback signal from a position sensor of each or the two main spindles. Then, a value corresponding to a rotational angle covered after the point of time when a one-revolution signal is generated from each position sensor is subtracted from each corresponding positional error counter. As a result, each main spindle is driven to be decelerated, and the two main spindles are brought to rotate in the same phase. Next, the two main spindles are subjected again to the speed loop control performed in accordance with the synchronous speed command, so that the main spindles rotate in the same phase and at the same speed.

While both the main spindles are being rotated, using either one of the rotation control methods described above, in accordance with the synchronous speed command common to the two main spindles and the position feedback signals supplied from the two position sensors, however, the rotating speed of one or both of the main spindles sometimes may be subject to small fluctuations from some cause. In this case, a small difference is caused between the position feedback signal associated with one main spindle and the position feedback signal associated with the other main spindle, and hence a difference is caused between positional deviations (speed commands) associated individually to the two main spindles. Therefore, velocity loops of the two main spindles, which are ordinally arranged to carry out both proportional control and integral control so as to produce torque commands in accordance with the speed commands and speed feedback signals, are supplied with input signals which are different from each other due to the difference in speed between the main spindles, e.g., at the start of the workpiece delivery, for example. As a result, a difference is caused between integral term outputs, and hence torque commands, from the two velocity loops after the start of the workpiece delivery, so that the workpiece is twisted.

In the application of the proposed method, particularly, the aforementioned awkward situation, attributable to the difference in speed between the main spindles at the start of the workpiece delivery, is liable to occur noticeably. Namely, if the difference is present between the respective speeds of the main spindles at the start of the workpiece delivery, different position feedback signals are supplied from the two position sensors to the two positional deviation counters, individually, so that different positional deviations are stored individually in the two counters. During the delivery of the workpiece during which the opposite end portions of the workpiece are grasped, since two spindle motors, which are connected through the workpiece to each other, rotate at the same speed, the workpiece rotates without being cleared of the twist caused at the start of the workpiece delivery. During the workpiece delivery, moreover, different speed deviations are respectively integrated by means of the velocity loops of the two main spindles, due to the difference generated at the start of the workpiece delivery between the positional deviation associated with the one main spindle and the position deviation associated with the other main spindle. Thus, during the workpiece delivery, different torque commands are generated individually from the two velocity loops, so that the workpiece is twisted. Moreover, the difference between the two torque commands gradually increases.

DISCLOSURE OF THE INVENTION

The object of the present invention is to provide a main spindle rotation control method capable of preventing a workpiece from being twisted during the delivery of the workpiece between two main spindles of a machine.

In order to achieve the above object, according to the present invention, there is provided a main spindle rotation control method for effecting velocity loop control, including integral control, for each of two main spindles of a machine so that the two main spindles rotate at the same speed, before a workpiece is delivered between the two main spindles. This control method comprises steps of: (a) determining whether or not the workpiece is being delivered from one main spindle to the other main spindle; and (b) inhibiting the integral control of the velocity loop control during the delivery of the workpiece. Preferably, prior to the workpiece delivery, position loop control for each of the main spindles is so effected as to rotate these spindles in the same phase.

According to the present invention, as described above, after the two main spindles are brought to rotate at the same speed, preferably at the same speed and in the same phase, the workpiece is delivered from the one main spindle to the other main spindle, and the integral control of the velocity loop control is inhibited during the workpiece delivery, so that the workpiece cannot be twisted during the workpiece delivery.

BEST MODE OF CARRYING OUT THE INVENTION

Figure 1:
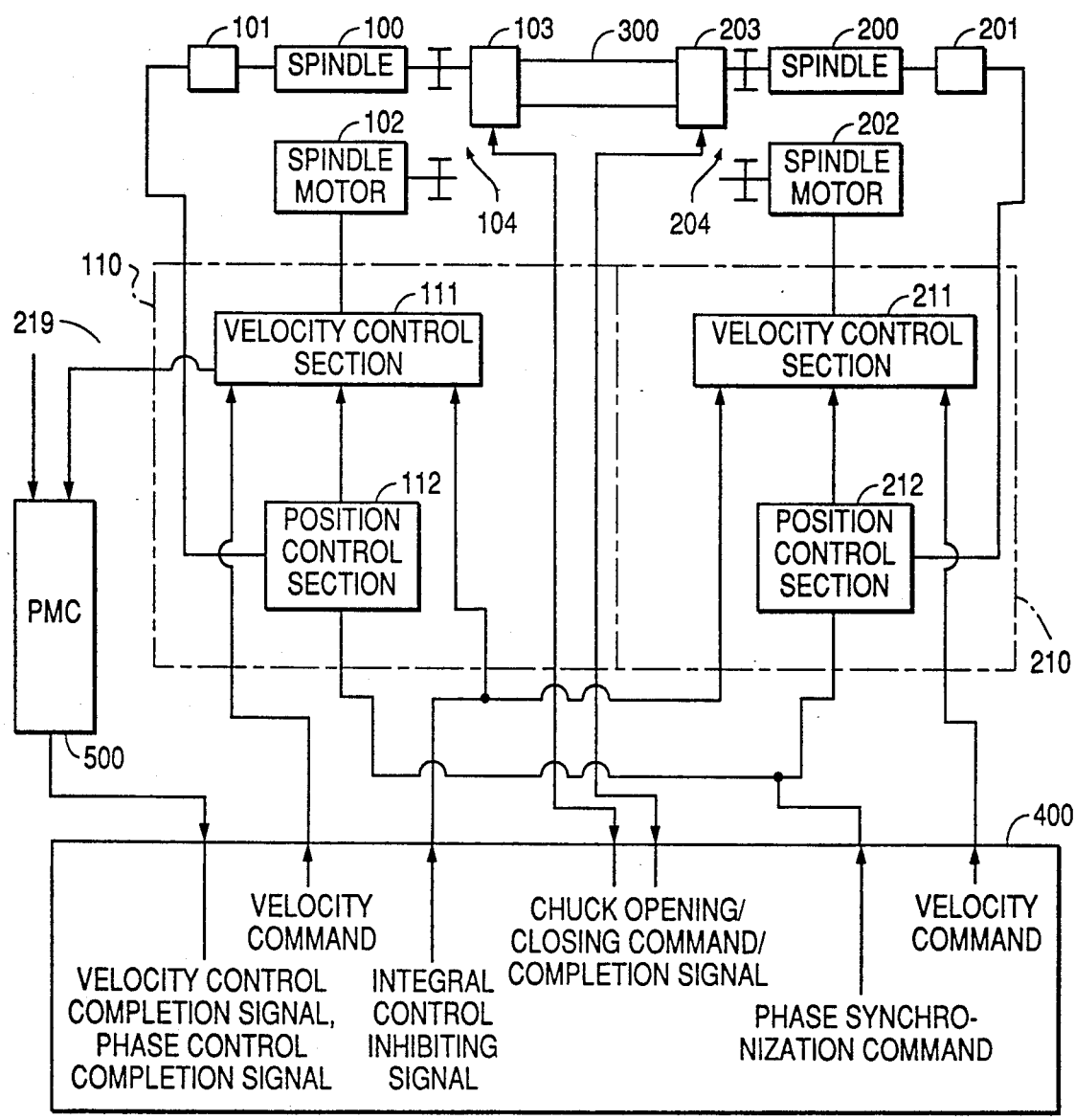
FIG. 1 is a functional block diagram showing a control apparatus for embodying a main spindle rotation control method according to a first embodiment of the present invention and its peripheral elements.

Referring to FIG. 1, a lathe, which is controlled by means of a main spindle rotation control apparatus for effecting a method according to one embodiment of the present invention, comprises first and second main spindles 100 and 200. A first grip section, having a first chuck 103 arranged to open and close for holding a workpiece 300, is coupled to one end of the first main spindle 100 for rotation in unison with the first main spindle. A first position coder 101, which is coupled to the other end of the first main spindle 100, is adapted to generate one pulse every time the first main spindle rotates for a predetermined rotational angle, and to generate a one-revolution signal every time the first main spindle assumes a predetermined rotational position. Further, a first spindle motor 102 is operatively coupled to the first main spindle 100 through first transmission means 104, which is comprised of a pair of gears, for example. The arrangement on the side of the second main spindle 200 is substantially the same as the arrangement on the side of the first main spindle 100, and reference numerals 201 to 204 denote elements which correspond to the elements 101 to 204, respectively.

The main spindle rotation control apparatus is operable in either an independent rotation mode wherein the control apparatus causes the first and second spindle motors 102 and 202 to rotate generally at different speeds under the control of a host control apparatus, e.g., a numerical control apparatus (NC apparatus) 400, or a synchronous rotation mode wherein the apparatus causes these motors to rotate at the same speed under the control of the NC apparatus. Further, the control apparatus is operable to effect special speed control for the two main spindles during the delivery of the workpiece 300 from one main spindle to the other, thereby preventing the workpiece from being twisted during the workpiece delivery. To this end, the main spindle rotation control apparatus comprises first and second spindle control circuits 110 and 210 having substantially tile same configuration. The two control circuits respectively include microprocessors (hereinafter referred to is first and second processors) for effecting position and speed loop control on software basis, so as to fulfill the functions of speed control sections 111 and 211 as well as the functions of position control sections 112 and 212. Each of the control circuits 110 and 210 includes a positional error counter, a position counter for counting output pulses from the position coder, and a latch circuit for storing a count value in the position counter at the point of time at which the one-revolution signal is generated.

Figure 3:
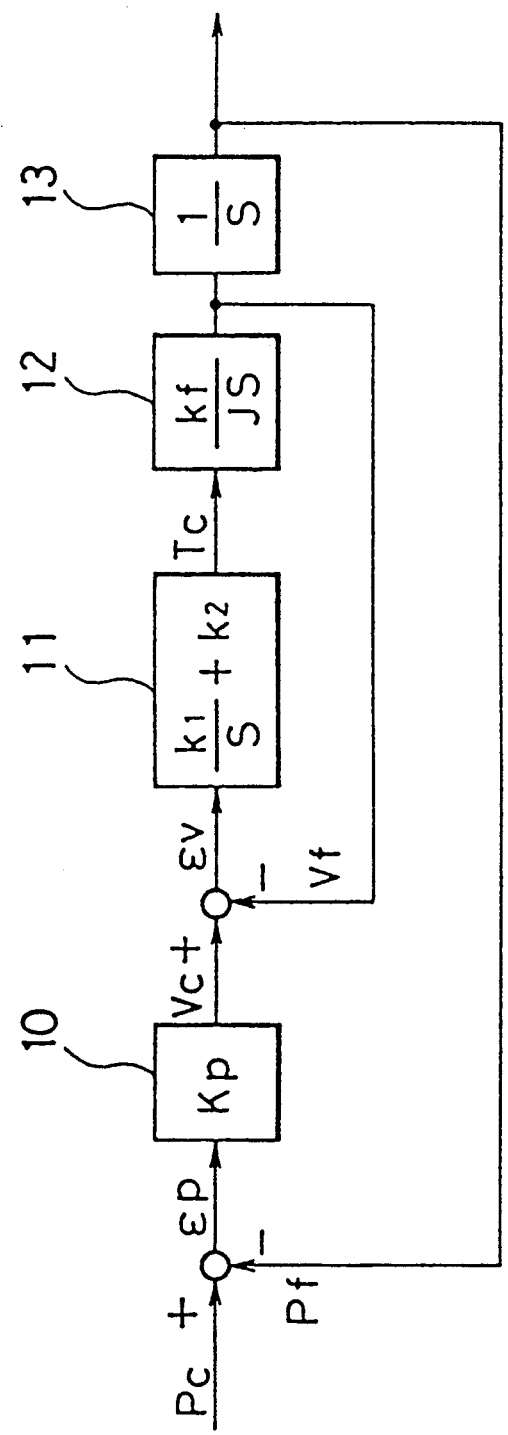
FIG. 3 is a block diagram showing a position control section and a velocity control section of the apparatus of FIG. 1.

Referring to FIG. 3, each of the first and second spindle control circuits 110 and 210 is arranged to generate a velocity command Vc, in a position loop element 10 with a position gain Kp, on the basis of a deviation (positional error) $\epsilon p$ between a position command Pc supplied from the NC apparatus 400 and a position feedback signal Pf supplied from the position coder 101 or 201. Also, each circuit is arranged to generate a torque command Tc, in a velocity loop element 11 with an integral gain K1 and proportional gain K2, on the basis of a deviation (velocity deviation) $\epsilon v$ between the velocity command Vc and a speed feedback signal Vf. Reference numerals 12 and 13 denote transfer elements which correspond to the spindle motor 102 or 202 and the position coder 101 or 102, respectively. Symbols J and Kt designate the inertia and torque constant, respectively, of the spindle motor.

The spindle control circuits 110 and 210 are operable to selectively execute either velocity loop control alone or both of position loop control and velocity loop control. In executing the velocity loop control only, integral control and proportional control, which are represented by a transfer function $(K1/S)+K2$, are performed by means of each of the speed control sections 111 and 211 in accordance with the velocity command Vc supplied from the NC apparatus 400. In the case of executing both the position loop control and the velocity loop control, the position loop control is performed in response to the position command Pc from the NC apparatus 400, and then the velocity loop control is performed in response to the velocity command Vc supplied from the position loop element 10. Irrespective of whether the velocity loop control alone is executed or both of the position loop control and the velocity loop control are executed, the integral gain K1 of each of the speed control sections 111 and 211 is set to "0" during the workpiece delivery, thereby inhibiting the integral control, in order to prevent the workpiece 300 from being twisted during the workpiece delivery. As a result, only the proportional control is executed in the velocity loop.

The following is the reason why the integral control is inhibited to prevent the workpiece from being twisted.

Let it be supposed, for example, that the workpiece 300 is held by means of first and second chucks 103 and 203 to be delivered from the first chuck 103 to the second chuck 203, after the first and second spindle motors 102 and 202 are brought to rotate at the same speed while undergoing small speed fluctuations, under the control of the first and second spindle control circuits 110 and 210 which execute the velocity loop control only. If a difference is produced between the respective rotating speeds of the first and second spindle motors 102 and 202 due to the rotating speed fluctuations at the start of the workpiece delivery, a difference is caused between the velocity feedback signal Vf in the first spindle control circuit 110 and the one in the second spindle control circuit 210. On the other hand, the two control circuits are supplied with the same velocity command Vc from the NC apparatus 400. Thus, a difference is caused between the velocity deviation ϵv in the first spindle control circuit and the one in the second spindle control circuit. As a result, the integral term output and proportional term output of the velocity control section 111 are different from those of the velocity control section 211, so that different torque command values Tc are delivered from the two velocity control sections. Thereafter, the two spindle motors 102 and 202, which are connected to each other by means of the workpiece 300 held by the first and second chucks 103 and 203, rotate at the same speed. Although the speed feedback signal Vf bound for the control circuit 110 and the one for the control circuit 210, and hence, the speed deviation ϵv in the control circuit 110 and the one in the control circuit 210, are identical with one another, therefore, different integral term outputs, and hence, different torque commands Tc, are delivered individually from the speed control sections 111 and 211 due to the difference between the speed deviations ϵv at the start of the workpiece delivery. As a result, the workpiece 300 is twisted.

In the case of executing both the position loop control and the velocity loop control, if a difference is present between the respective rotating speeds of the first and second spindle motors 102 and 202, due to the motor speed fluctuations at the start of the workpiece delivery performed after the two motors are brought to rotate at the same speed and in the same phase under the control of the first and second spindle control circuits 110 and 210, a difference is caused between the position feedback signals Pf in the two spindle control circuits. On the other hand, the two control circuits are supplied with the same position command Pc from the NC apparatus 400. Thus, a difference is caused between the positional error ϵp in the control circuit 110 and the one in the control circuit 210. Thereafter, the two spindle motors 102 and 202, which are connected by the workpiece 300, rotate at the same speed, so that the two control circuits are supplied with the same position feedback signal Pf. After all, the difference caused at the start of the workpiece delivery between the positional errors ϵ of the two control circuits cannot be removed. After the start of the workpiece delivery, therefore, the velocity control sections 111 and 211 are supplied with the same speed feedback signal Vf, and also supplied with different speed commands Vc from the position control sections 112 and 212, so that different velocity deviations ϵv are integrated individually in the two velocity control sections 111 and 211. As a result, the difference between the torque commands Tc delivered individually from the two velocity control sections gradually increases, so that the workpiece 300 is twisted.

As apparent from the foregoing explanation, the twist of the workpiece 300 during the workpiece delivery is mainly attributable to the integral control in the speed control sections 111 and 211. In order to prevent the workpiece from being twisted, in the present embodiment, the respective integral gains K1 of the velocity control sections 111 and 211 are set to "0" during the workpiece delivery, so as to inhibit the integral control in both the velocity control sections, so that the respective output torques of the two spindle motors 103 and 203 are controlled to the same value.

The NC apparatus 400 is operable to generate a chuck opening command signal and a chuck closing command signal to each of the first and second chucks 103 and 203 in association with the workpiece delivery, and also generate a synchronous control command, synchronous velocity command signal, integral control inhibiting signal, and phase synchronization command signal in association with the synchronous rotation mode. The first and second chucks 103 and 203 are operable to respond to the command signals to open and close to thereby release and hold the workpiece 300, and then deliver a chuck opening completion signal and a chuck closing completion signal when their opening and closing actions end, respectively. A processor (hereinafter referred to as PMC processor) of a programmable machine controller 500, which is connected to the NC apparatus 400, is arranged to deliver a phase control completion signal when it discriminates completion of phase control for the first a second main spindles 100 and 200, and also deliver a velocity control completion signal when attainments of a synchronous rotation speed by the first and second main spindles are discriminated in succession by means of the first and second processors.

In the following, the operation of the main spindle rotation control apparatus shown in FIG. 1 will be explained.

Figure 2:
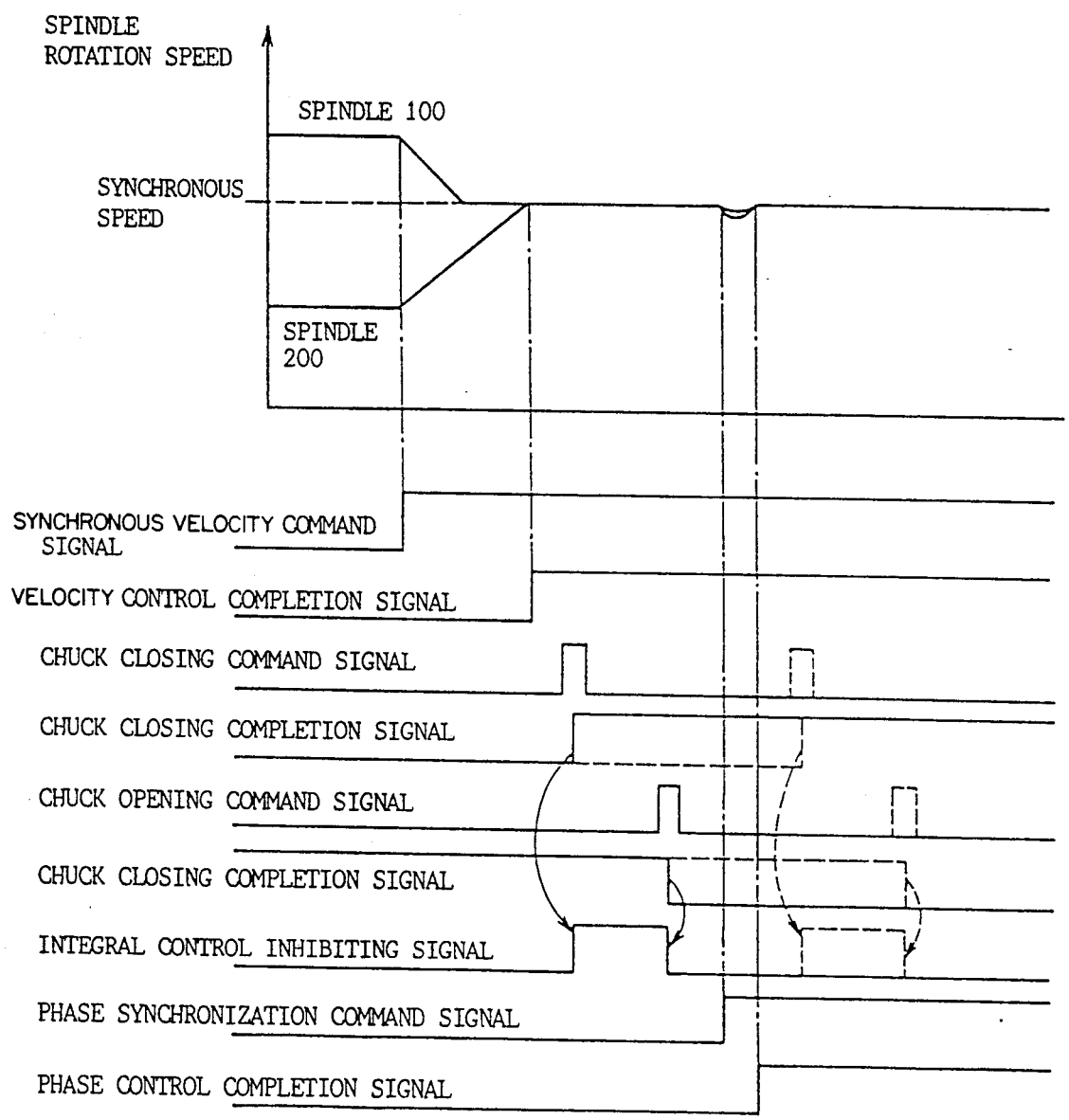
FIG. 2 is a timing chart illustrating changes of the respective rotating speeds of first and second main spindles during main spindle rotation control by means of the apparatus of FIG. 1 and the on-off timing of various signals.

Basically, the main spindle rotation control apparatus operates in the same manner as the control apparatus according to the proposed method described above. More specifically, when the main spindle rotation control apparatus is operating in a independent control mode, the first and second spindle control circuits 110 and 210 respectively perform velocity control for the first and second spindle motors 102 and 202 in response to speed commands individually delivered from the NC apparatus 400 and generally different from each other. As a result, the first and second main spindles 100 and 200, which are respectively coupled to these motors through the first and second transmission means 104 and 204, rotate at different speeds, as shown in FIG. 2.

Thereafter, when the synchronous control command is delivered from the NC apparatus 400, the operation mode of the main spindle control apparatus is switched from the independent control mode to the synchronous control mode. In this control mode, only the velocity loop control is executed, if the workpiece 300 has a shape which is not anisotropic with respect to the workpiece axis, such as a cylindrical shape, without the execution of the position loop control. In this case, the first and second processors perform the velocity loop control for the first and second spindle motors 102 and 202 in response to the synchronous velocity command signal supplied from the NC apparatus 400, in such a manner that the first and second main spindles 100, 200 are rotated at the same synchronous rotating speed. As a result, the respective rotating speeds of the main spindles change toward the synchronous rotating speed, and enter a predetermined speed range which covers the synchronous rotating speed, as shown in FIG. 2. When the rotating speed of one of the main spindles 100 and 200 enters the predetermined speed range, its corresponding processor notifies the PMC processor of this fact. When the arrivals of the respective rotating speeds of the two main spindles at the predetermined range are discriminated in succession by means of the first and second processors, the PMC processor delivers the speed control completion signal to the NC apparatus 400.

In the case of executing the velocity loop control alone as described above, in order to deliver the workpiece 300 from one main spindle to the other main spindle in response to the speed control completion signal, the NC apparatus 400 supplies the chuck closing command signal associated with the other main spindle. In delivering the workpiece 300 from the first main spindle 100 to the second main spindle 200, for example, the chuck closing command signal is supplied to the second chuck 203. In response to the chuck closing completion signal delivered from the second chuck 203 upon completion of the closing action, the integral control inhibiting signal is delivered from the NC apparatus to the first and second spindle control circuits 110 and 210.

As a result, the respective integral gains K1 of the speed control sections 111 and 211 of the two control circuits are "0," that is, the integral control in both the velocity control sections is inhibited, and only the proportional control is rendered effective. As shown in FIG. 2, the integral control inhibiting signal lasts until the workpiece 300 is released from that chuck, e.g., the first chuck 103, which has been holding the workpiece from an instant prior to the start of the workpiece delivery. In contrast with the case where the integral control is validated during the workpiece delivery, the difference between the torque commands Tc delivered individually from the velocity control sections 111 and 211 of the two control circuits never gradually increases, during the workpiece delivery, under the influence of the difference between the velocity deviation $\epsilon v$ in the first spindle control circuit 110 and that in the second spindle control circuit 210 resulting from the difference generated at the start of the workpiece delivery between the rotating speeds of the first and second main spindles. As a result, the workpiece 300 is prevented from being twisted during the workpiece delivery.

Thereafter, when the chuck opening completion signal is delivered from the first chuck 103 at the end of the opening action of this chuck effected in response to the chuck opening command signal supplied from the NC apparatus 400 to the chuck, the NC apparatus 400 turns off the integral control inhibiting signal. As a result, the respective integral gains K1 of the velocity control sections 111 and 211 are reset to a predetermined value, and the velocity loop control, including both the integral control and proportional control, is executed by means of both the velocity control sections.

In case that the workpiece 300 has a shape with anisotropy with respect to the workpiece axis, both the position loop control and the velocity loop control are executed in the synchronous control mode. Thus, as in the case of the cylindrical workpiece, the velocity loop control is executed in such a manner that the first and second main spindles 100 and 200 rotate at the synchronous rotating speed. When the NC apparatus 400 receives the velocity control completion signal, thereafter, it delivers the phase synchronization command signal to the first and second processors.

In response to the phase synchronization command signal, the first and second processors execute a control process associated with the proposed method described above, so as to rotate the first and second main spindles 100, 200 at the same speed and in the same phase. Briefly, positional deviation amounts, calculated by the processors on the basis of the synchronous speed command signal and corresponding to the synchronous rotating speed, are respectively set in the positional error counters of the first and second spindle control circuits 110 and 210. Then, the position loop control is performed for the respective main spindle in accordance with a move command corresponding to the synchronous rotating speed and the position feedback signal supplied from the respective position coder 101 or 201. Further, an amount of the rotational angle from an instant at which the one-revolution signal is generated by each position coder is subtracted from a corresponding one of the positional error counters. As a result, each main spindle is driven to be decelerated, and the two main spindles are brought to rotate in the same phase. Thereafter, the velocity loop control is effected in accordance with the synchronous speed command signal, so that the two main spindles are brought to rotate in the same phase and at the same synchronous rotating speed. At this time, the phase control completion signal is delivered from the PMC processor which has discriminated the completion of the phase control.

In order to execute workpiece delivery, the NC apparatus 400 responds to the phase control completion signal to deliver the chuck closing command signal (indicated by broken line in FIG. 2) to, e.g., the second chuck 203, and then responds to the chuck closing completion signal from the second chuck 203 to supply the integral control inhibiting signal (indicated by broken line in FIG. 2) to the first and second spindle control circuits 110 and 210. As a consequence, the integral control in the speed control sections 111 and 211 of these control circuits is rendered ineffective, so that the workpiece is prevented from being twisted during the workpiece delivery. Thereafter, the, NC apparatus 400 turns off the integral control inhibiting signal in response to the chuck opening completion signal (indicated by broken line in FIG. 2) supplied from the first chuck 103 at the end of its opening action performed in response to the chuck opening command signal (indicated by broken line in FIG. 2) from the NC apparatus 400.

We claim:

1. A main spindle rotation control method for effecting velocity loop control, including proportional control and integral control, for each of two main spindles of a machine so that the two main spindles rotate at the same speed, before a workpiece is delivered between the two main spindles, comprising the steps of:
    (a) determining whether or not the workpiece is to be delivered from one of the two main spindles to the other; and
    (b) inhibiting the integral control and effecting the proportional control of the velocity loop control during a delivery of the workpiece.

2. A main spindle rotation control method according to claim 1, wherein position loop control for each of the two main spindles is so effected as to rotate the two main spindles in the same phase, prior to the delivery of the workpiece.

3. A main spindle rotation control method for effecting velocity loop control, including integral control, for each of two main spindles of a machine so that the two main spindles rotate at the same speed, before a workpiece is delivered between the two main spindles, comprising the steps of:
    (a) determining whether or not the workpiece is to be delivered from one of the two main spindles to the other; and (b) inhibiting the integral control of the velocity loop control during a delivery of the workpiece, the integral control being inhibited by setting an integral gain for the velocity loop control to zero.

4. A main spindle rotation control method according to claim 1, wherein opening and closing actions of chucks coupled individually to the two main spindles are discriminated, and, during a time period from an instant at which the closing action of the chuck coupled to the other of the two main spindles is completed to an instant at which the opening action of the chuck coupled to the one of the two main spindles is completed, it is concluded that the workpiece is being delivered.

5. A spindle rotation control method for effecting position loop control and velocity loop control using integral control and proportional control, so that first and second spindles of a machine rotate at substantially the same speed during coupling of a workpiece between the first and second spindles, comprising the steps of:

a) coupling the first spindle to the workpiece;

b) determining whether the coupling of the workpiece between the first and second spindles is to be performed;

c) inhibiting the integral control by setting an integral gain of the velocity loop control, to zero and effecting the proportional control of at least one of the first and second spindles, based on said step (b);

d) controlling the first and second spindles, based on said step (c); and e) coupling the second spindle to the workpiece, based on said step (b) while performing said step (d).

6. A spindle rotation control method as claimed in claim 5, further comprising the step of:

f) decoupling the first spindle from the workpiece after performing said step (e).

* * * * *

UNITED STATES PATENT AND TRADEMARK OFFICE
CERTIFICATE OF CORRECTION

PATENT NO. : 5,319,288

DATED : June 7, 1994

INVENTOR(S) : Shinichi KONO et al.

It is certified that error appears in the above-indentified patent and that said Letters Patent is hereby corrected as shown below:

COVER PAGE, [75] Inventors, line 2, "Oshino" should be --Minamitsuru--.

Column 3, line 66, "tile" should be --the--.

Column 4, line 1, "is" should be --as--.

line 22, "speed" should be --velocity--; and line 34, "speed" should be --velocity--.

Column 6, line 19, "a" should be --and; and line 32, "a" should be --an--.

UNITED STATES PATENT AND TRADEMARK OFFICE
CERTIFICATE OF CORRECTION

PATENT NO. : 5,319,288
DATED : June 7, 1994
INVENTOR(S) : Shinichi KONO et al

It is certified that error appears in the above-indentified patent and that said Letters Patent is hereby corrected as shown below:

Column 7, line 19, after "are" insert --set to --.

Column 8, line 30, "speed" should be --velocity--; and
         line 33, after "the" delete the ",".

Signed and Sealed this

Twenty-first Day of February, 1995

Attest:

BRUCE LEHMAN

Attesting Officer     Commissioner of Patents and Trademarks